(12) United States Patent
Tuluie et al.

(10) Patent No.: US 6,733,294 B2
(45) Date of Patent: May 11, 2004

(54) MOTORCYCLE CORNERING SIMULATOR

(75) Inventors: Robin Tuluie, Minneapolis, MN (US); Paul J. Carroll, Maple Grove, MN (US); Gary Stewart, Raleigh, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/961,794

(22) Filed: Sep. 24, 2001

(65) Prior Publication Data

US 2003/0059744 A1 Mar. 27, 2003

(51) Int. Cl.[7] .............................. G09B 9/04; G09B 19/16
(52) U.S. Cl. ........................................................ 434/61
(58) Field of Search ............................... 434/20, 61, 62, 434/365, 373, 376; 73/117, 798, 862.541; 345/157; 180/21, 219; 362/468; 152/526

(56) References Cited

U.S. PATENT DOCUMENTS

| | | | | |
|---|---|---|---|---|
| 3,686,776 A | * | 8/1972 | Dahl | 434/61 |
| 4,024,388 A | * | 5/1977 | Skoff | 362/467 |
| 4,203,500 A | * | 5/1980 | Kamiya | 180/219 |
| 4,313,511 A | * | 2/1982 | Soo Hoo | 180/21 |
| 4,880,043 A | * | 11/1989 | Decima et al. | 152/526 |
| 5,445,013 A | * | 8/1995 | Clayton et al. | 73/117 |
| 5,452,605 A | * | 9/1995 | Wilson et al. | 73/117 |
| 5,547,382 A | * | 8/1996 | Yamasaki et al. | 434/61 |
| 5,602,759 A | | 2/1997 | Harashima et al. | |
| 5,821,434 A | * | 10/1998 | Halliday | 73/862.541 |
| 6,030,223 A | * | 2/2000 | Sugimori | 434/61 |
| 6,234,800 B1 | * | 5/2001 | Koyama et al. | 434/61 |
| 6,433,775 B1 | * | 8/2002 | Gould et al. | 345/157 |
| 6,457,369 B1 | * | 10/2002 | Petersen | 73/798 |
| 6,505,503 B1 | * | 1/2003 | Teresi et al. | 73/117 |
| 2002/0055422 A1 | * | 5/2002 | Airmet et al. | 482/61 |
| 2003/0059744 A1 | * | 3/2003 | Tuluie et al. | 434/61 |

FOREIGN PATENT DOCUMENTS

| | | | |
|---|---|---|---|
| DE | 42 07 805 A1 | * 9/1993 | 434/61 |
| JP | 5-265371 A | * 10/1993 | 434/61 |

OTHER PUBLICATIONS

SAE Technical Paper Series 901524, "The Motorcycle and Its Components in the Operating Strength Testing Laboratory," Aug. 13–16, 1990 (12 pages).

Application Notes brochure of MTS, "Tire–Coupled Multi-Axial Simulator Lets Motorcycle Manufacturers Perform Road Simulation Testing," Dec. 1996.

Experimental Techniques, "BMW Present Motorcycles Testing Rig," Nov./Dec. 1992 (5 pages).

SAE Technical Paper Series 931912, "Development of Multi–use Road Simulator," Nov. 15–19, 1993 (pp. 1–9).

A description of Model 334 Road Simulator sold by MTS Systems Corporation before Sep. 2000.

* cited by examiner

*Primary Examiner*—Joe H. Cheng
(74) *Attorney, Agent, or Firm*—Westman, Champlin & Kelly, P.A.; S. Koehler (57) ABSTRACT

A testing machine and method are provided for simulating cornering loads on at least a vehicle component. This testing machine and method includes an actuator having an actuator rod oriented at an angle with respect to a level support surface, the angle being selected as a function of a cornering angle of the vehicle during operation.

24 Claims, 6 Drawing Sheets

MOTORCYCLE CORNERING SIMULATOR

BACKGROUND OF THE INVENTION

The present invention relates to testing apparatuses used to simulate forces exerted upon a vehicle as it is operated. More particularly, the present invention relates to a testing apparatus used to simulate cornering loads experienced by a cycle such as a motorcycle or bicycle.

Testing apparatuses or systems used to simulate loads upon a vehicle as it is operated are well known. Commonly, actuators, struts and/or bell cranks are operably connected to the test vehicle in order to simulate loads exerted thereon. For example, actuators, struts and/or bell cranks are commonly connected to apply vertical and longitudinal loads to the test vehicle. In other embodiments, lateral loads (perpendicular to the vertical and longitudinal loads) can also be applied.

Some vehicles, such as motorcycles, have unique operating characteristics that affect the loading on the vehicle when operated under certain conditions. For instance, it is quite common to lean a motorcycle when executing a turn. The extent of lean can vary depending upon the speed of the motorcycle, and can be quite extensive under race conditions. Although testing apparatuses have been advanced to simulate loads upon a motorcycle, proper simulation of loads while the motorcycle is leaning through a turn have not been advanced.

There is thus an ongoing need to improve testing apparatuses used to simulate loads upon a vehicle in the laboratory. In particular, there exists a need for providing proper simulation of cornering loads on vehicles such as motorcycles or bicycles.

SUMMARY OF THE INVENTION

A testing machine and method are provided for simulating cornering loads on at least a vehicle component. This testing machine and method includes an actuator having an actuator rod oriented at an angle with respect to a level support surface, the angle being selected as a function of a cornering angle of the vehicle during operation.

The testing machine is particularly well suited for simulating cornering loads on a cycle such as a motorcycle or a bicycle. As another aspect of the present invention, the testing machine includes a first actuator couplable to a front suspension of the cycle through, for example, a front wheel thereof to impart forces therein, while a second actuator is couplable to a rear suspension of the cycle through, for example, a rear wheel thereof to impart forces therein. The vertically oriented actuators are rotated about an angle corresponding to the cornering angle of the cycle.

As a further aspect of the present invention, a method for simulating cornering loads on a cycle is provided. The method includes supporting the cycle in a substantially upright position and imparting loads to the cycle wherein the loads are directed at an angle with respect to a level support surface. The angle is selected as a function of a cornering angle of a cornering angle of the cycle during operation.

In yet another aspect of the present invention, a testing machine for simulating cornering loads on a cycle includes a first support for supporting a front portion of the cycle and the second support for supporting a rear portion of the cycle. Each support includes an inclined member oriented at an angle selected as a function of a cornering angle of the cycle during operation. An actuator is further coupled to the cycle and oriented to apply a force in a direction parallel to the weight of the cycle.

DETAILED DESCRIPTION OF THE PREFERRED EMBODIMENTS

Figure 1:
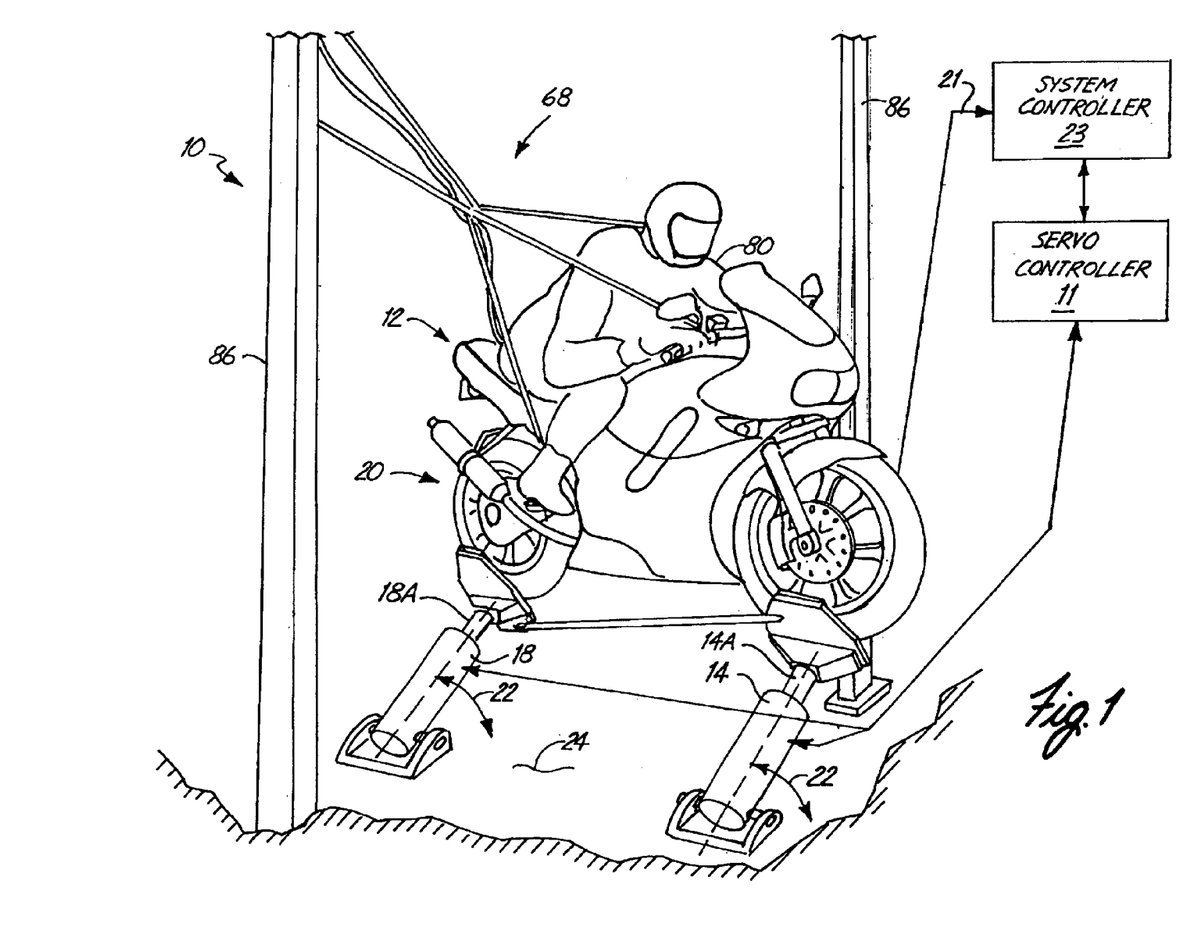
FIG. 1 is a schematic, perspective view of the first embodiment of a testing machine of the present invention.
Figure 6:
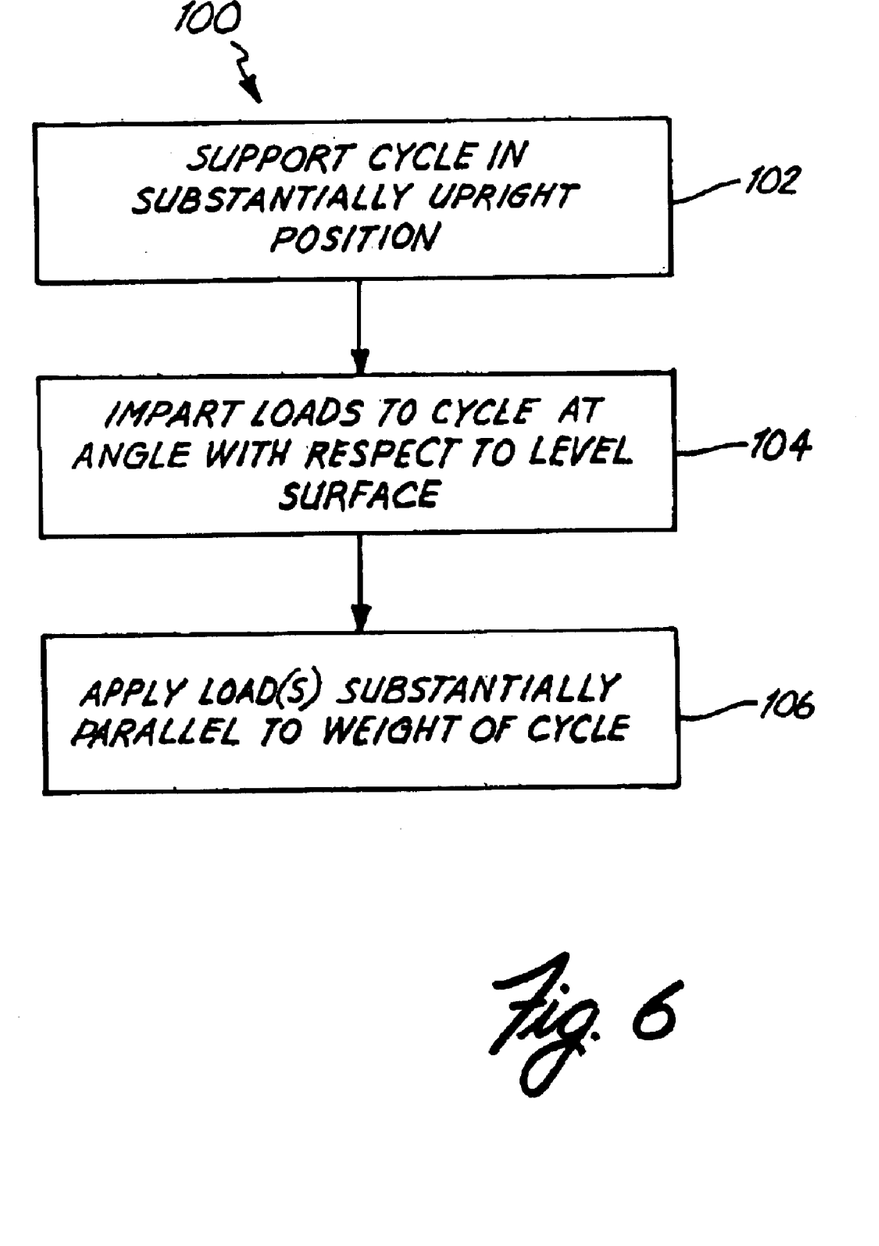
FIG. 6 is a flowchart for a method of simulating cornering loads on a cycle.

A first embodiment of a testing machine 10 for simulating cornering loads on a cycle 12 is illustrated in FIG. 1. As a further aspect of the present invention, a method 100 (FIG. 6) for simulating cornering loads on a cycle 12 is provided. The method 100 includes supporting the cycle 12 in a substantially upright position at step 102 and imparting loads to the cycle 12 at step 104 wherein the loads are directed at an angle with respect to a level support surface. The angle is selected as a function of a cornering angle of a cornering angle of the cycle 12 during operation.

Generally, at step 102, in one embodiment, the testing machine 10 includes a first actuator 14 couplable to a front suspension 16 of the cycle 12 through, for example, a front wheel to impart forces therein, at step 104, while a second actuator 18 is couplable to a rear suspension 20 of the cycle 12 through, for example, a rear wheel to impart forces therein, at step 104. Each actuator 14, 18 includes an actuator rod 14A, 18A, respectively, having a longitudinal axis oriented at an angle 22 (FIG. 2) with respect to a level support surface 24. The angle 22 is selected as a function of a cornering angle of the cycle during operation. Although illustrated wherein, the testing machine 10 includes two actuators 14 and 18 in order to simulate cornering loads on all of the cycle 12. It should be noted that if it is desired that only a portion of the cycle 12 be tested, a single actuator oriented in a manner described above can be used. For instance, if it is desired only to load the rear suspension 20, then only a single actuator need be used.

In this embodiment, the testing machine 10 includes a servo controller 11. The servo controller 11 provides actuator command signals to the actuators 14 and 18, which in turn, excite the cycle 12. Suitable feedback is provided from the actuators 14 and 18 to the servo controller 11. One or more remote transducers on the cycle 12, such as displacement sensors, strain gauges, accelerometers, or the like, provide a measured or actual response 21. The system controller 23 generates drive signals for the servo controller 11 to obtain desired loading. Various well-known control algorithms can be used by the system controller 23.

Figure 2:
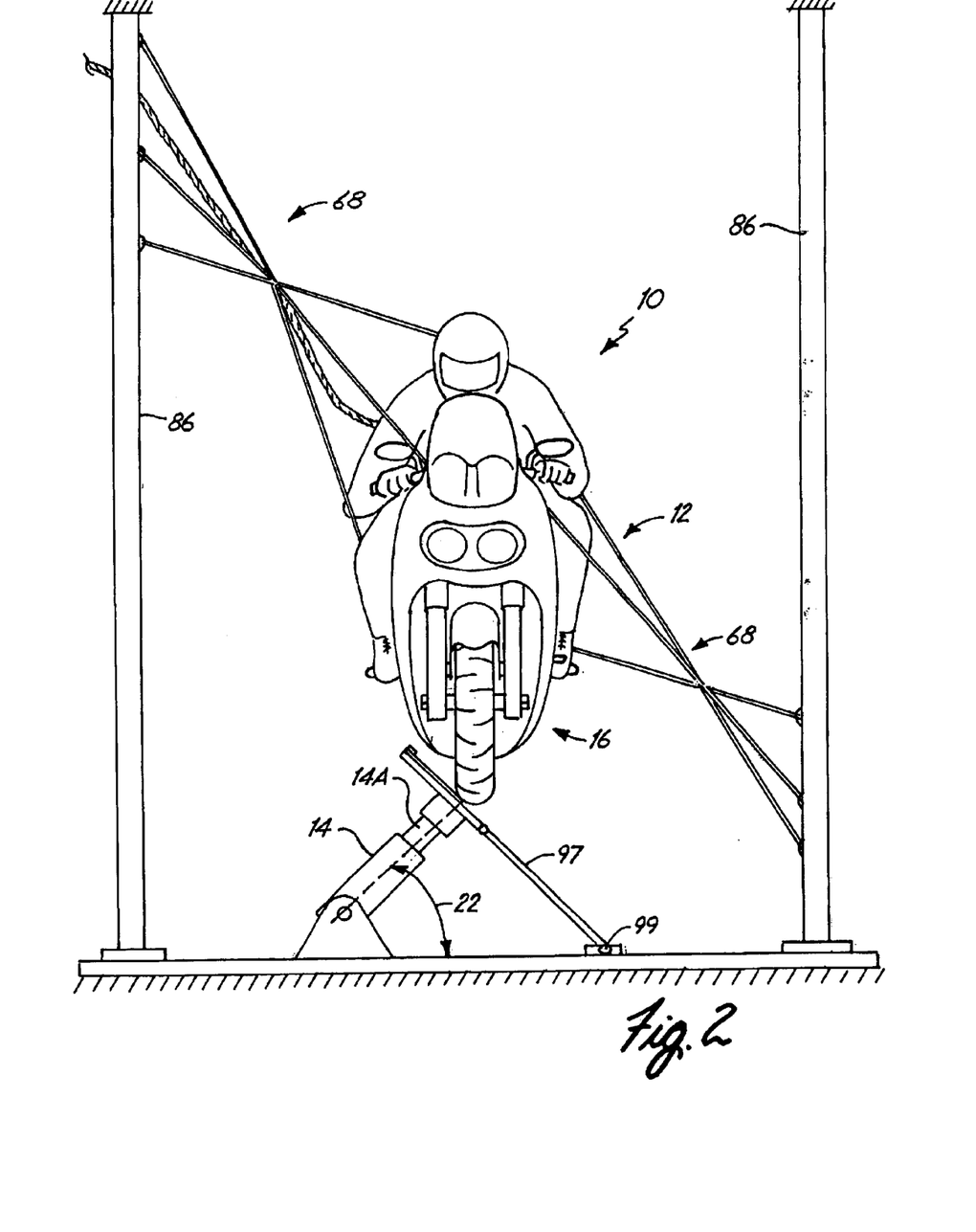
FIG. 2 is a front-elevational view of the embodiment of FIG. 1.

As illustrated in FIGS. 1 and 2, the cycle 12, or a portion thereof, is oriented in an upright position on inclined plate members. As discussed below, the static loads and dynamic loads are imparted to the cycle 12 with this orientation of the actuators 14 and 18.

Figure 3:
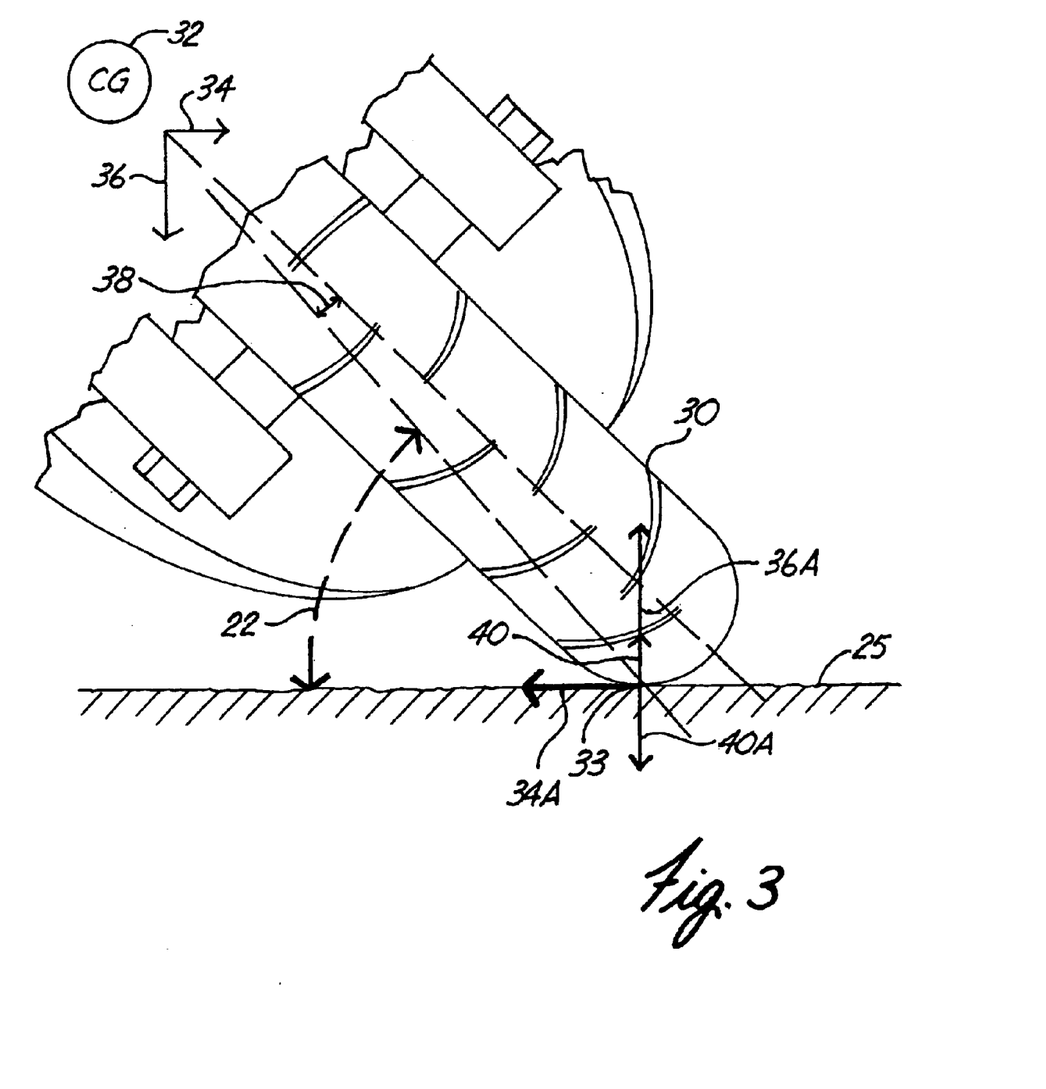
FIG. 3 is a schematic, front-elevational view of a portion of a cycle during cornering.

Simulation of cornering loads may best be understood by first examining loads present on the cycle 12 during cornering. Referring to FIG. 3, a schematic representation of a cycle includes a tire 30 leaning at the angle 22 with respect to a road surface 25. A CG (center of gravity) 32 generates forces with respect to a tire contact patch 33 that can be resolved as a lateral force 34A and a vertical force 36A. The lateral force 34A and the vertical force 36A are reacted at the contact patch 33 to provide the reaction force to a centrifugal force 34 and weight 36 of the cycle 12 and rider 36A. It should also be noted that the contact patch 33 is offset by an angle 38 with respect to a center line 30A of the tire 30. As the cornering dynamics of the cycle 12 are concerned, the forces 34, 34A, 36, and 36A are the steady state forces for smooth travel around a corner.

Occasionally, the cycle 12 will encounter a disturbance in the road, which in the illustration of FIG. 3 is represented as a vertical force 40. The vertical force 40 is reacted by a force 40A at the contact patch 33.

Figure 4:
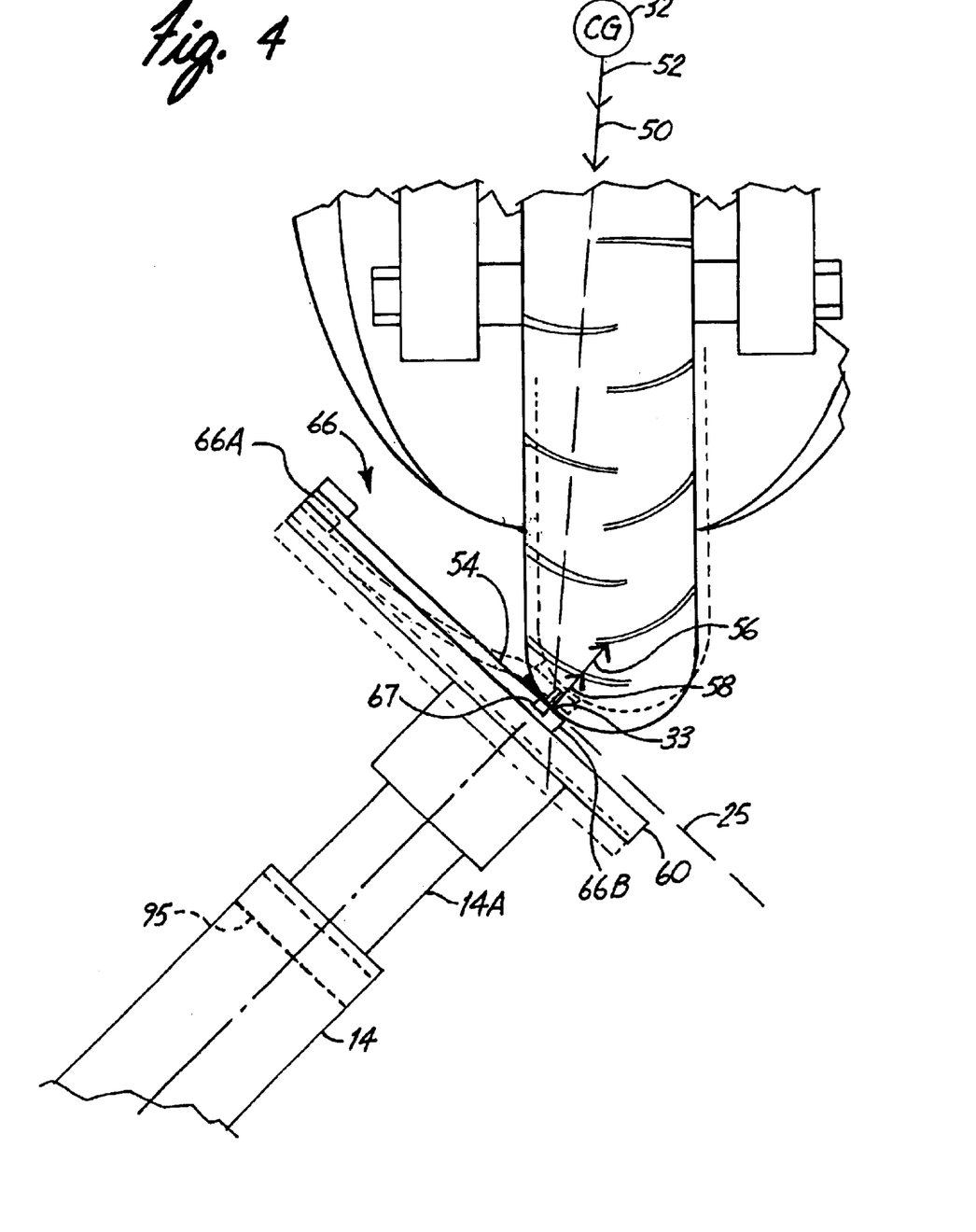
FIG. 4 is a schematic, front-elevational view of a portion of the testing machine.

FIG. 4 illustrates how the cornering forces are simulated on the testing machine 10. In general, the force diagram of FIG. 3 is rotated so that the road surface 25 is inclined and the CG 32 is directly above the contact patch 33. With the cycle 12 on the testing machine 10, the weight 50 is present from the CG 32. Although no lateral force is present from CG 32, the forces developed at the contact patch 33 include a lateral force 54 and a vertical force 56. Relative to the cycle 12, the lateral force 54 and the vertical force 56 have the same orientation as the lateral force 34A and the vertical force 36A of FIG. 3; however, the magnitude of the sum of lateral force 54 and the vertical force 56 is exactly equal to the vertical force 50. With the cycle 12 mounted to the testing machine 10, the proportion between the lateral force 54 and the vertical force 56 is the same as the cornering forces experienced by the cycle during a turn; however, the magnitudes of these forces are generally lower due to the force 50 being equal to the weight of the cycle and any attached dummy 80. However, by then applying a load 52 substantially parallel to the vertical force 50, the magnitudes of the lateral force 54 and the vertical force 56 can be increased to match the magnitudes of forces 34A and 36A.

It should be noted that since the CG 32 is substantially directly above the contact patch 33, the cycle 12 (as represented by the center line 30A of the tire 30) is slightly inclined or leaning corresponding to the angle 38.

Dynamic loads such as from disturbances or bumps in the road are also simulated. In particular, the dynamic load is represented by force 58. As further illustrated in FIG. 4, an actuator, herein the first actuator 14, can be operated to apply, and thus, simulate the dynamic loads.

In the embodiment illustrated, each of the tires of the cycle 12 engage plate members 60 that are mounted to ends of the actuator rods 14A and 18A. The tires can be secured or otherwise mounted to the plate member 60, preferably, at each of the contact patches 33; however, in a further embodiment a loose connection is provided at the contact patch 33 in order to simulate movement of the tire 30 away from the road surface, for instance, due to a bump in the road. In the illustrated embodiment, a coupling 66, provided at step 102, allows the corresponding tire of the cycle 12 to substantially separate from the corresponding plate member 60 yet retain the tire 30 and thus the cycle 12 on the testing machine 10 by applying the lateral force through coupling 66 even if the tire loses contact momentarily with plate member 60. The coupling 66 includes an end 66A affixed to the plate member 60 away from (herein above) the contact patch 33 and a second end 66B secured to the tire at the contact patch 33. The coupling 66 is substantially rigid in tension so as to maintain the position of the cycle 12 on the plate member 60. In one embodiment, the coupling 66 comprises a strap. As appreciated by those skilled in the art, a rope, chain or the like can also be used. As stated above, the coupling 66 allows movement of the tire away from the plate member 60, and to a limited extent, across the plate member 60.

Fastening bolts or screws 67 can be used to secure the coupling device 66 to the tire. In one embodiment, recesses are provided in the coupling device 66 such that the heads of the bolts 67 do not contact the plate member 60. Connection of the coupling device 66 at the contact patch 33 is advantageous because this connection retains the compliance of the sidewall of the tire 30, thereby not artificially stiffening the tire 30 due to mounting of the cycle 12 on the test machine 10. Of course, if the tire 30 was secured directly to the plate member 60 at the contact patch 33 without the coupling 66, small disturbances or bumps could still be applied with simulation.

It should also be noted that orientation of the cycle 12 on the test machine 10 is particularly advantageous because in a substantially upright position, as illustrated, the cycle 12 can be inertially constrained with suitable springs such as the elongated elastomeric elements 68 illustrated in FIGS. 1 and 2 secured to supports 86. In this manner, an inertial restraint is provided rather than a fixed reaction restraint. This form of restraint is beneficial since it is similar to the restraint provided on the cycle 12 as it is cornering on the road in that the forces are reacted by the mass of the cycle 12 and the rider.

Referring back to FIG. 1, an upright position of the cycle 12 also allows the dummy 80 to be mounted upon the cycle 12 to simulate an operator. It is important to note that due to the upright position of the cycle 12, the weight of the dummy 80 can be properly distributed upon the cycle 12 during cornering. Although the elastomeric bands 68 provide a convenient restraint system, other restraint systems can also be provided. For instance, linear bearing members can be interposed between the cycle and the rigid supports 86 to allow vertical movement of the cycle 12 during testing. Likewise, long, elongated rods can be coupled to the rigid supports 86 and the cycle 12 with elastomeric bushings which provide some compliance during vertical motion of the cycle 12. Accordingly, various forms of restraint systems can be used to provide compliance in the vertical direction.

Figure 5:
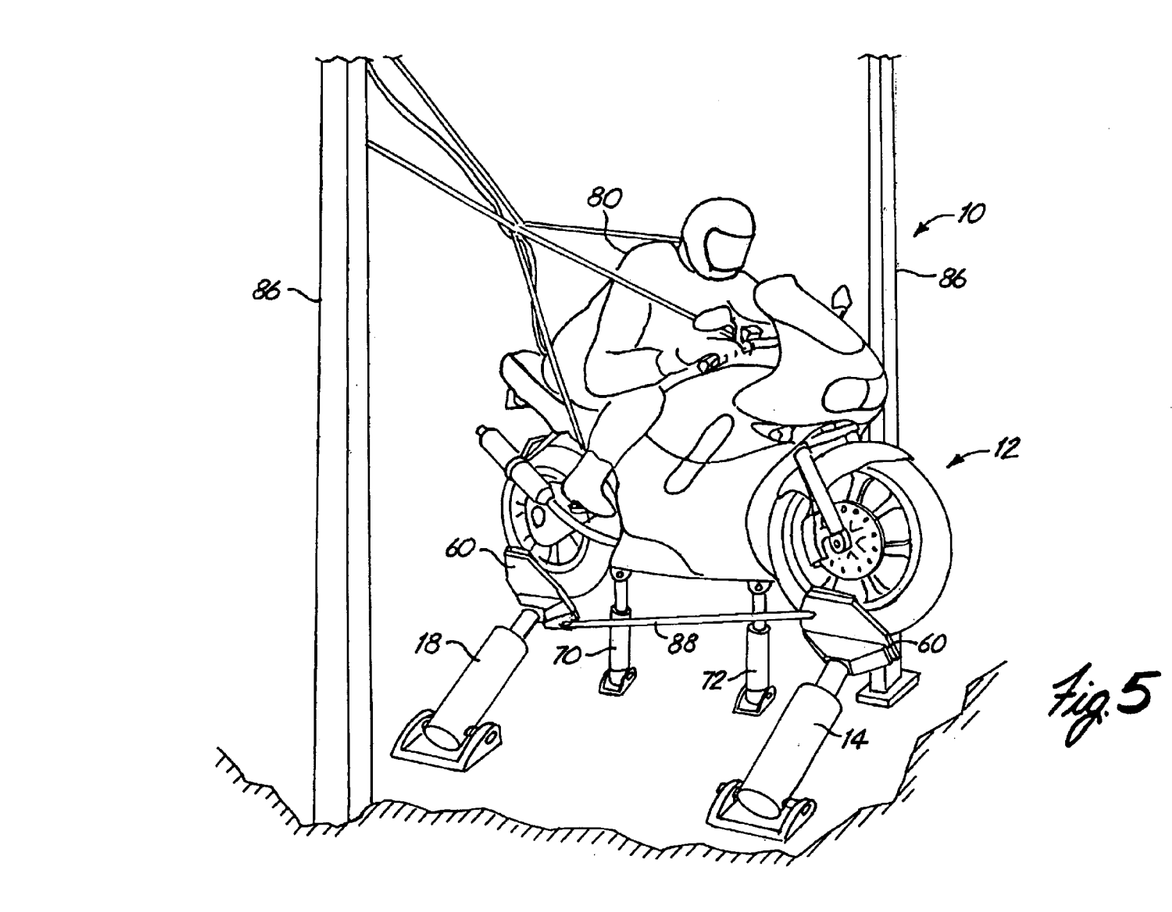
FIG. 5 is a schematic, side-elevational view of a second embodiment of a testing machine of the present invention.

Referring to FIG. 5, the force 50 of FIG. 4 can be provided by various means including an actuator positioned above the cycle 12, as indicated by step 106, to apply a force downwardly, by springs connected to the cycle 12 or as illustrated, by an actuator 70 located below the cycle 12 and coupled to a convenient location on the cycle 12. In one embodiment, the actuator 70 is a "soft" actuator, which can apply a desired force yet still provide significant displacement while applying the force. A suitable actuator is described in detail in U.S. patent application Ser. No. 09/438,010, entitled "Loading Assembly Having A Soft Actuator", filed Nov. 10, 1999, now U.S. Pat. No. 6,457,369 Bl, and sold by MTS Systems Corporation of Eden Prairie, Minn.

In a further embodiment, and as indicated at step 106, an additional actuator 72 is also provided to generate a vertical force that is spaced-apart from the force of the actuator 70. In this manner, differential operation of the actuators 70 and 72 can simulate pitching of the cycle 12 due to acceleration or braking. Likewise, heaving of cycle can be obtained by simultaneous, non-differential operation of the actuators 70 and 72.

It should be also noted that simulation of static cornering loads on the cycle 12 require only a first support for supporting a front portion of the cycle 12 and a second support for supporting a rear portion of the cycle 12. Each of the supports is inclined at an angle selected as a function of a cornering angle of the cycle 12 during operation. The actuator 70, or other load applying device, is coupled to the cycle 12 and is oriented to apply a force in a direction generally parallel to the weight of the cycle 12. In a further embodiment, the plate members 60 and the actuator rod 14A and 18A are restrained from rotating, at step 102. Restraint can be provided individually on each of the actuators 14 and 18 such as by rod members, bands or the like. In the embodiment illustrated in FIGS. 1 and 5, an elongated rod 88 is pivotally coupled to each of the plate members 60 and thereby couples the plate members 60 together to inhibit rotation.

It should be noted that in view of the inclined orientation of the actuators 14 and 18, considerable side loading upon the actuator rods 14A and 18A (FIG. 4) is present. In one embodiment, hydraulic bearings 95 are provided in the actuators 14 and 18 to counteract the side loading. If hydraulic bearings 95 are present in the actuators 14 and 18, a rigid connection (possibly adjustable) to ground can be provided at a remote end of the actuator from the plate members 60. In an alternative embodiment, the actuators 14 and 18 can be pivotally mounted at the remote end and a support brace 97 can be provided. The support brace 97 can be pivotally coupled to the plate member 60 and pivotally coupled to a fixed support 99. In this configuration, the actuators 14 and 18 need not be provided with hydraulic bearings.

Although the present invention has been described with reference to preferred embodiments, workers skilled in the art will recognize that changes may be made in form and detail without departing from the spirit and scope of the invention.

What is claimed is:

1. A loading machine for applying loads that simulates cornering loads on a cycle, the loading machine comprising:
    a first actuator couplable to a front suspension of the cycle to impart forces therein;
    a second actuator couplable to a rear suspension of the cycle to impart forces therein; and
    wherein each actuator includes an actuator rod having a longitudinal axis oriented at an angle with respect to a level support surface, the angle being selected as a function of a cornering angle of the cycle during operation.

2. The loading machine of claim 1 wherein the actuators are couplable to tires of the cycle with a coupling, and wherein each actuator includes a member to support a tire of the cycle.

3. The loading machine of claim 2 wherein the coupling of each actuator allows the corresponding tire of the cycle to substantially separate from the corresponding member.

4. The loading machine of claim 3 wherein each of the couplings is rigid in tension.

5. The loading machine of claim 3 wherein each coupling comprises a strap.

6. The loading machine of claim 2 and further comprising a rigid rod coupled to the members to inhibit simultaneous rotation of the members in the same direction.

7. The loading machine of claim 2 and further comprising means for inhibiting simultaneous rotation of the members.

8. The loading machine of claim 2 and further comprising means for coupling each of the members to the cycle and allowing limited displacement relative to the members.

9. The loading machine of claim 1 and further comprising a third actuator couplable to the cycle and oriented to apply a force in a direction parallel to a weight of the cycle.

10. The loading machine of claim 6 and further comprising a fourth actuator couplable to the cycle at a spaced apart location from the third actuator and oriented to apply a force in a direction parallel to the weight of the cycle.

11. A method for simulating cornering loads on a cycle, the method comprising:
    supporting the cycle in a substantially upright position; and
    imparting loads to the cycle wherein the loads are directed at an angle with respect to a level support surface, the angle being selected as a function of a cornering angle of the cycle during operation.

12. The method of claim 11 wherein supporting the cycle includes supporting the cycle on a first actuator couplable to a front suspension of the cycle to impart forces therein, and a second actuator couplable to a rear suspension of the cycle to impart forces therein, wherein each actuator includes an actuator rod having a longitudinal axis oriented at the angle, and wherein imparting loads including operating the actuators to impart loads on the cycle.

13. The method of claim 12 wherein supporting the cycle includes coupling each of the tires to the actuators to allow the corresponding tire of the cycle to substantially separate from the corresponding member.

14. The method of claim 13 wherein supporting the cycle includes coupling each of the tires with a tension rigid member.

15. The method of claim 14 wherein supporting the cycle includes supporting each of the tires on a member attached to an end of each actuator.

16. The method of claim 15 wherein supporting the cycle includes inhibiting simultaneous rotation of the members.

17. The method of claim 11 and further comprising applying a load substantially parallel to a weight of the cycle.

18. The method of claim 11 and further comprising applying selective loads to the cycle at two different locations on the cycle, the loads being substantially parallel to a weight of the cycle.

19. A loading machine for simulating cornering loads on a cycle, the loading machine comprising:
    a first support for supporting a front portion of the cycle;
    a second support for supporting a rear portion of the cycle;
    wherein each support includes an inclined member inclined at an angle with respect to a level support surface, the angle being selected as a function of a cornering angle of the cycle during operation; and
    an actuator couplable to the cycle and oriented to apply a force in a direction parallel to a weight of the cycle.

20. The loading machine of claim 19 and further comprising a second actuator couplable to the cycle at a spaced apart location from the first-mentioned actuator and oriented to a apply a force in a direction parallel to the weight of the cycle.

21. The loading machine of claim 20 wherein each support comprises an inclined actuator and further includes a coupling device coupling a tire to the actuator.

22. The loading machine of claim 21 wherein each coupling device comprises a flexible strap.

23. The loading machine of claim 21 wherein each coupling device allows limited movement away from the surface of the corresponding inclined member.

24. A loading machine for simulating cornering loads on at least a vehicle component, the loading machine comprising:

an actuator having an actuator rod oriented at an angle with respect to a level support surface, the angle being selected as a function of a cornering angle of the vehicle during operation; and a coupling device joined to a remote end of the actuator rod and couplable to a tire of vehicle component.

* * * * *

UNITED STATES PATENT AND TRADEMARK OFFICE
CERTIFICATE OF CORRECTION

PATENT NO.    : 6,733,294 B2
DATED         : May 11, 2004
INVENTOR(S)   : Tuluie It is certified that error appears in the above-identified patent and that said Letters Patent is hereby corrected as shown below:

<u>Column 6,</u>
Line 55, "to a apply a force in a direction" should be -- to apply a force in a direction --

Signed and Sealed this

Twentieth Day of July, 2004

JON W. DUDAS
*Acting Director of the United States Patent and Trademark Office*